United States Patent
Nordmark et al.

(10) Patent No.: US 9,774,491 B2
(45) Date of Patent: Sep. 26, 2017

(54) JAMMING DETECTION METHOD AND DEVICE

(71) Applicant: SECURITAS DIRECT AKTIEBOLAG, Malmo (SE)

(72) Inventors: Per Lars Nordmark, Malmo (SE); Angel Piorno Iglesias, Madrid (ES); Jon Noble Echeverria, Madrid (ES)

(73) Assignee: VERISURE SÀRL, Versoix (CH)

( * ) Notice: Subject to any disclaimer, the term of this patent is extended or adjusted under 35 U.S.C. 154(b) by 0 days.

(21) Appl. No.: 15/148,534

(22) Filed: May 6, 2016

(65) Prior Publication Data

US 2016/0330069 A1    Nov. 10, 2016

(30) Foreign Application Priority Data

May 8, 2015   (EP) ................................. 15382243

(51) Int. Cl.

| | |
|---|---|
| *H04L 12/24* | (2006.01) |
| *H04L 12/26* | (2006.01) |
| *H04W 72/04* | (2009.01) |
| *G08B 13/04* | (2006.01) |
| *G08B 25/10* | (2006.01) |
| *G08B 26/00* | (2006.01) |
| *G08B 29/08* | (2006.01) |
| *G08B 29/12* | (2006.01) |

(52) U.S. Cl.
CPC .......... *H04L 41/0631* (2013.01); *G08B 25/10* (2013.01); *G08B 26/007* (2013.01); *G08B 29/08* (2013.01); *G08B 29/123* (2013.01); *H04L 43/16* (2013.01); *H04W 72/0453* (2013.01)

(58) Field of Classification Search
CPC ..... H04L 41/0631; H04L 43/16; H04L 12/24; H04L 12/26; H04W 72/0453; H04W 72/04; G08B 25/10; G08B 26/007; G08B 29/08; G08B 29/123
See application file for complete search history.

(56) References Cited

U.S. PATENT DOCUMENTS

| 4,117,405 | A | * | 9/1978 | Martinez | ................. H03L 7/235 331/1 A |
| 8,320,872 | B2 | * | 11/2012 | Snider | .................... B60R 25/00 455/404.1 |
| 9,102,293 | B2 | * | 8/2015 | Dabholkar | ............. B60R 25/10 |
| 9,338,677 | B2 | * | 5/2016 | Hederstierna | ....... H04W 76/021 |
| 2010/0295672 | A1 | * | 11/2010 | Hyland | .................... H04Q 9/00 340/539.1 |
| 2017/0032655 | A1 | * | 2/2017 | Mu | ........................ G08B 21/20 |

FOREIGN PATENT DOCUMENTS

| GB | 2457102 A | * | 8/2009 | ............. G08B 13/04 |
| SE | EP 2541518 A1 | * | 1/2013 | ......... G08B 13/2491 |

\* cited by examiner

*Primary Examiner* — Pablo Tran

(57) ABSTRACT

Jamming detection device (7) and method, which scan one or more frequency bands (201, 401, 402) and, if jamming is detected in said frequency bands (201, 401, 402), transmits an alarm signal through an ultra narrow band network (8). Preferably, both an ISM network (2) connecting a control panel (3) and at least one peripheral (1), and a GSM network (4) connecting the control panel (3) and a back end service (5), are scanned. Also preferably, the ultra narrow band network (8) is implemented over the same frequency band (801) as the ISM network (2) connecting the control panel (3) and the least one peripheral (1).

12 Claims, 2 Drawing Sheets

JAMMING DETECTION METHOD AND DEVICE

FIELD OF THE INVENTION

The present invention has its application within the security sector and, especially, in the industrial area engaged in providing intruder and theft alarms.

BACKGROUND OF THE INVENTION

Modern security and surveillance systems, such as those providing intruder or burglar alarms, typically comprise a central control panel connected to a plurality of peripherals such as video cameras, microphones, pressure sensors, temperature sensors, movement detectors, etc. When a possible threat is detected by any of the peripherals, said peripheral alerts the central control panel, which in turn transmits an alert signal to a remote centralized back-end service. Communications between peripherals and control panel, and between control panel and back-end services can be performed either through wired or through wireless communication systems. However, wired communications can be easily tampered, effectively disengaging the security system. Wireless communications are hence regarded as being more secure, but they can also be subjected to attacks through intentional jamming. When this occurs, the wireless communication channel is actively interfered, reducing the signal to noise ratio of the transmitted signals and rendering communication impossible. Although less likely, a similar scenario can occur as a result of unintentional interferences from nearby radio frequency systems.

In order to establish defenses against this kind of accidental or active jamming, several alternatives have been proposed in the state of the art. For example, patent document GB-2457102-A discloses an intruder detection system where the alarm signal is transmitted wirelessly. In case of jamming, the interference is detected by a sensor, and the transmission frequency is modified to avoid the jammed frequency range. However, modifying the frequency may not be enough to avoid the jamming. If the intruder manages to completely jam all the frequency band within which said transmission frequency can be tuned, the alarm signal will still not be received.

Patent document US-2014/0369452-A1 presents an alternative approach based on a multi-channel communication link between the transmitter and the receiver of a global navigation satellite system (GNSS) network. When jamming is detected, the number of channels used for data transmission is progressively reduced, increasing jamming resilience. Nevertheless, this approach could not be straightforwardly applied to wireless communication networks used in security systems such as Industrial Scientific and Medical (ISM) radio networks and Global System for Mobile Communications (GSM) networks. Furthermore, the maximum achievable jamming protection is limited by the channel bandwidth of the architecture of the network used for the communication link, which could prove insufficient in some scenarios.

Finally, patent document U.S. Pat. No. 4,117,405-A1 discloses an alarm transmission system relying on an ultra narrow band network (UNB), given its inherent resistance against jammers. The system comprises a plurality of alarm stations, each of them locked to a finely tuned local oscillator. A distinctive local oscillator frequency is assigned to each alarm station. However, although some jamming resistance is incorporated, the actual presence of jamming is neither checked nor notified to the back-end service, hence giving the intruders more freedom during their tampering attempt. Furthermore, by using a fixed frequency in each station, the system is more predictable and easily tampered, and it requires significant resources to be employed in calibration and frequency drift corrections. Finally, UNB networks are devised for multi-point to point services in which each element rarely needs to access the communication medium. Using the UNB by default in all communications between elements of the security system limits the total traffic and the number of deployable alarm stations.

Therefore, there is still the need in the state of the art of a jamming detection technique that effectively protects security systems against aggressive jamming of their wireless communications. Furthermore, it is still desirable that said jamming detection technique does not limit the number of elements connected to the back-end service or the data load among them when no jamming is present, and that it presents a reduced energy consumption for increased autonomy, and therefore, a more prolonged and reliable protection.

SUMMARY OF THE INVENTION

The current invention solves all the aforementioned problems by disclosing a jamming detector that relies on an ultra narrowband network for alarm signal transmission in the presence of jamming, without affecting the normal operation of said security system when no jamming is present.

In a first aspect of the invention, a jamming detection device is disclosed. The device comprises a transceiver configured to periodically scan one or more frequency bands used for signal transmission between elements of a security system such as an intruder or theft alert system. When jamming is detected within at least one of said frequency bands, the device is configured to send an alarm signal through an ultra narrow band network, significantly more resilient to malicious jamming than conventional networks.

Preferably, the device is configured to periodically scan the following networks:

An Industrial Scientific and Medical (ISM) radio network connecting one or more peripherals of the security system and a central control panel installed in the same location as the peripherals. Peripherals can comprise detectors such as video cameras, temperature sensors, movement sensors, etc.; alarms such as visual signs or sound systems; user-activated devices, or any other device associated to the security system. More preferably, the ISM network is established over the 868 MHz band for radio communications in Europe and in the 915 MHz band in America.

A Global System for Mobile Communications (GSM) network connecting the control panel and a remote back-end service of the security system, typically used for alarm signal transmission in the absence of jamming. More preferably, the device scans both the 900 MHz and the 1800 MHz frequency bands of the GSM network for the presence of jamming.

Also preferably, the Ultra Narrowband (UNB) network used by the device for transmitting the alarm signal is established in a frequency band partially or fully overlapping the ISM radio network connecting the peripherals and the control panel. According to the aforementioned preferred option for said ISM network, the ultra narrowband network is established over the 868 MHz radio frequency band.

In order to be able to scan all the relevant frequency bands with the same transceiver, said transceiver preferably comprises a local oscillator generating multiple harmonics of its main frequency. For example, this can be implemented with a local oscillator generating a signal with a rectangular waveform, which results in a significant third order harmonic generation. This enables to scan different frequency bands by tuning different harmonics of the generated signal. In the same example, the first order harmonic can be used to scan the 868 MHz band of the ISM network and the 900 MHz band of the GSM network, whereas the third order harmonic is used to scan the 1800 MHz band of said GSM network.

Some preferred options for medium access control and signal modulation for the alarm signal transmission in the ultra narrowband network include random frequency hopping and binary-phase-shift-keying modulation. As a result, the alarm signal is preferably transmitted using a signal bandwidth equal or lesser than 200 Hz. The central frequency of said signal bandwidth is randomly chosen within a 200 KHz band of the UNB network. Given this extremely narrow signal bandwidth and the unpredictability of the precise frequency over which the alarm signal is transmitted, active jamming systems are unable to interfere with the operation of the UNB network.

When jamming is detected during the scanning of the different frequency bands, the alarm signal generated by the device preferably comprises an identifier of the at least a frequency band being jammed and a first numerical value representing a jamming intensity. The first numerical value may be, for example, a radio frequency signal intensity measurement, or a number of channels of a frequency band in which the measured intensity exceeds a given threshold. Once the device detects that the jamming is finished, an alarm signal is also generated comprising a second numerical value indicating the duration of the jamming.

Furthermore, the jamming detection device may include additional features which are capable of generating alarm signals that are transmitted over the UNB network:

An accelerometer for tampering detection. When a measurement of the accelerometer exceeds at least a first threshold, an alarm message is generated. This prevents any intruder from manually disabling the jamming detection device before attempting to jam the security system communications.

A thermometer. When a measurement of the accelerometer exceeds at least a second threshold, an alarm message is generated. Said second threshold can delimit an absolute temperature range, or it can be applied to a temperature gradient which combines multiple thermometer measurements.

A user interface that enables a user of the security system to send alarm messages at any desired time. The interface may be as simple as a button that the user can press during a risk scenario, or include more complex input and output capabilities such as screens, microphones, etc. This feature also enables the user to check that UNB communications are working properly.

In another aspect of the present invention, a method for jamming detection in a security system is disclosed. The method comprises the following steps:

Scanning at least a frequency band of a security system to detect jamming. The scanned frequency bands preferably comprise a 868 MHz frequency band (or 915 MHz in America) in a ISM network connecting a control panel and the peripherals, and a 900 MHz and a 1800 MHz frequency bands in a GSM network connecting the control panel and the back-end services.

When jamming is detected during the frequency band scans, sending an alarm signal to the back-end service through an ultra narrowband network. This step may preferably comprise applying random frequency hopping and/or binary-phase-shift-keying modulation to the transmitted alarm signal. Preferably, this step comprises transmitting the alarm signal through a channel with a 200 Hz bandwidth or less. Furthermore, this step may comprise including in the alarm signal an identifier of the at least a frequency band being jammed, a first numerical value representing a jamming intensity. When the jamming is determined to have finished, a second numerical value representing a jamming duration is also transmitted.

Preferably, the method further comprises measuring a displacement of an accelerometer and transmitting an alarm signal through the UNB network when said displacement exceeds a first threshold.

Preferably, the method further comprises measuring a temperature of a thermometer and transmitting an alarm signal through the UNB network when said temperature exceeds a second threshold. Said second threshold may be an absolute temperature range and/or a temperature gradient range.

Preferably, the method further comprises transmitting an alarm signal through the UNB network when receiving a user command through a user interface.

With the disclosed method and device, security and surveillance systems become resilient to intentional or accidental jamming of their wireless communications. When no jamming is present, the method and device do not impose any limitation on the normal operation of the security system. The jamming detector is also protected from physical tampering of the device, as well as from sudden temperature changes caused, for example, by a nearby fire or from certain tampering instruments. Furthermore, the disclosed ultra narrow band network greatly optimizes energy consumption during data transmission towards the base station, therefore increasing the autonomy of the jamming detection device. These and other advantages will be apparent at the light of the detailed description of the invention.

Additional advantages and features of the invention will become apparent from the detailed description that follows and will be particularly pointed out in the appended claims.

BRIEF DESCRIPTION OF THE DRAWINGS

For the purpose of aiding the understanding of the characteristics of the invention, according to a preferred practical embodiment thereof and in order to complement this description, the following figures are attached as an integral part thereof, having an illustrative and non-limiting character.

DETAILED DESCRIPTION OF THE INVENTION

The matters defined in this detailed description are provided to assist in a comprehensive understanding of the invention. Accordingly, those of ordinary skill in the art will recognize that variation changes and modifications of the embodiments described herein can be made without departing from the scope and spirit of the invention. In particular, note that any particular embodiment or feature of the device of the invention may be applied to the method of the invention and vice versa. Also, description of well-known functions and elements are omitted for clarity and conciseness.

In this text, the term "ultra narrow band network" refers to any wireless network in which the spectrum of a transmitted signal is confined to a small spectral range, being said spectral range actively limited through signal modulation and/or signal processing techniques. The ultra narrow band network is therefore a network with a narrower transmission bandwidth and increased resistance against jamming than any other network used for communications within the security system. An ultra narrow band network can be defined by having a ratio between a channel bandwidth and the total frequency bandwidth of the UNB network below a given threshold. Alternatively, the UNB network can be defined by having a ratio between channel bandwidth and carrier frequency below a given threshold, or by having an absolute channel bandwidth below another given threshold. In the particular embodiments disclosed herein, a channel bandwidth of 200 Hz or less is used.

Note that the specific ranges of the frequency bands mentioned in this description may be subjected to changes according to each particular embodiment and to the regulations of each particular country. Also note that in the preferred embodiments of the invention, the jamming detection device is described for simplicity as a stand-alone device. Nevertheless, its components and features could be also integrated within other components of the security system, such as the main control panel or any peripheral intruder sensor.

Figure 1:
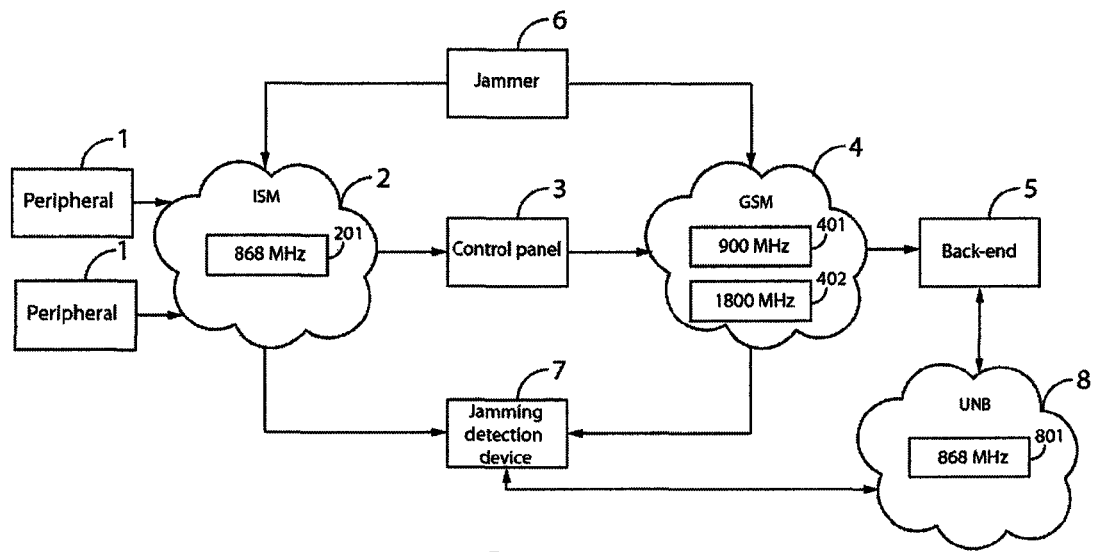
FIG. 1 shows a schematic scenario to which the jamming detection device of the invention is applied, according to a particular embodiment thereof.

FIG. 1 schematically depicts the main elements of a scenario in which particular embodiments of the jamming detection method and device of the invention are applied, namely a wireless security system where a malicious jamming is attempted. The security system comprises a plurality of peripherals (1) such as video cameras, microphones, pressure sensors, temperature sensors, alarms, etc. Peripherals (1) are connected to the central control panel (3) through an ISM network (2). The control panel (3) is also connected to the back-end service (5) through a GSM network (4). Note that alternative wireless technologies may be applied to each of the communication links. In the particular case of the connection between the control panel (3) and the back-end service (5), 3G or 4G technologies may be used. Nevertheless, 3G and 4G modems incorporated in control panels typically scale down to GSM connections when jamming is detected, so protecting GSM network (4) from jamming attacks implicitly protects said 3G and 4G networks. In particular, the ISM network (2) is established over the 868 MHz frequency band (201) (915 MHz in America), whereas the GSM network (4) is established over the 900 MHz frequency band (401) and the 1800 MHz frequency band (402).

In Europe, The ISM 868 MHz frequency band (201) comprises the range between 863 MHz and 870 MHz and is used by license-free device. In America the ISM 915 MHz frequency band comprises the range between 902 MHz and 928 MHz and is also used by license-free device. The 900 MHz frequency band (401) ranges from 880 MHz to 960 MHz and is used by cell operators for GSM and 3G communications. The 1800 MHz frequency band (402) ranges from 1710 MHz to 1880 MHz and is used by cell operators for GSM and 4G communications. Notice that the security system is independent from the present invention, which only requires the knowledge of the frequency band (or bands) which need to be protected from jamming. Also notice that particular embodiments of the present invention may comprise scanning different frequency bands and/or different communication networks.

A threat to the security system, such as a jammer (6) is also depicted, targeting both the ISM network (2) and the GSM network (4). Both attacks are detected by a jamming detection device (7). The jamming detection device (7) is connected to the back-end service (5) through an ultra narrowband network (8), resilient to jamming. In particular, transmissions over the UNB network (8) are also performed in the 868 MHz frequency band (801). The jamming detection device (7) periodically scans for jamming all the frequency bands used by the security system. When jamming is detected, an alert signal is sent through the UNB network (8) to the back-end service (5). The UNB network (8) may comprise any number of stations receiving the signal simultaneously and sending said signal to the back-end service (5).

Figure 2:
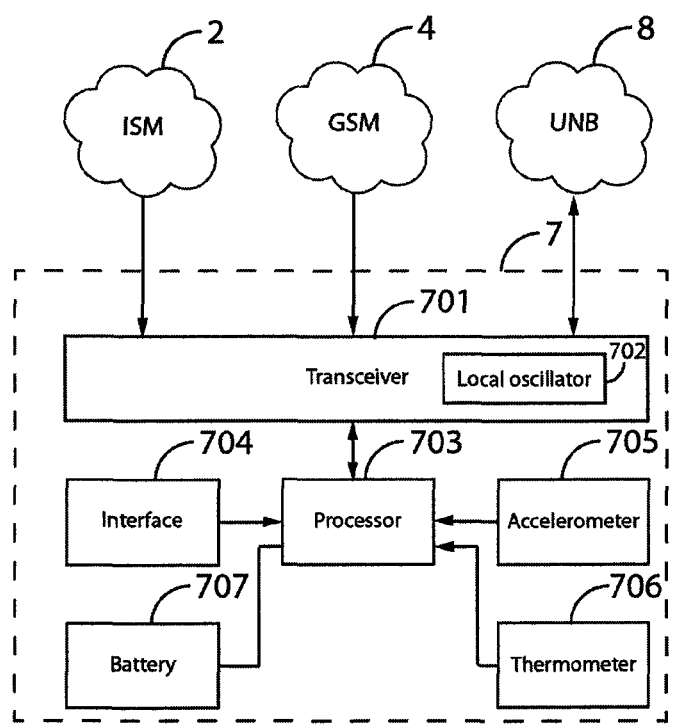
FIG. 2 presents with further detail the components comprised by the jamming detection device according to a particular embodiment thereof.

FIG. 2 presents in further detail the components of the jamming detection device (7), as well as the networks with which the device (7) interacts. The device (7) comprises a transceiver (701) with a local oscillator (702). For example, the transceiver (701) may be a low-current transceiver covering the sub-GHz frequency bands. A single local oscillator (702) is used for both transmission and reception modes, since both do not occur at the same time. In particular, the local oscillator (702) is implemented by combining an integrated voltage-controlled oscillator (VCO) and a $\Delta\Sigma$ fractional-N Phase-Locked Loop (PLL). Since the resulting waveform presents a squared or rectangular shape, its third harmonic component can be used to scan frequency bands above the natural 1 GHz limit of the transceiver (701). When transmitting through UNB network (8), the transceiver (701) applies random frequency hopping and binary-phase-shift-keying modulation.

The device (7) also comprises a processor (703) which coordinates the rest of the elements of the device (7) and implements the decision algorithms leading to the transmission of alarm signals. The processor may be implemented in a computer, a digital signal processor, a field-programmable gate array, an application-specific integrated circuit, a microprocessor, a micro-controller, or any other form of programmable hardware, being preferred the low-consumption integrated options. Furthermore, the processor (703) comprises a computer program which implements the method of the invention when executed, therefore controlling the device of the invention and processing the measured data.

The device (7) comprises several additional sensors and elements that can result in the generation of an alarm signal for other causes beyond jamming detection. In particular, the device (7) comprises a user interface (704), an accelerometer (705), a thermometer (706) and a battery (707). All these elements improve the security of the device (7) itself, and therefore improve its robustness for jamming detection in a synergic manner.

In a preferred embodiment, the user interface (704) simply comprises a button and a visual indicator such as a LED light. Nevertheless, alternative embodiments may comprise more complex user interfaces (704) such as screens, touch screens, microphones, speakers, etc. The interface (704) may be used by the user to send alarm messages or any other request through the UNB network (8); as well as to communicate the user the status of the device (7) or any additional information. Notice that there may be particular embodiments in which the user has no active involvement in the operation of the device (7), and therefore the device (7) presents no user interface.

The accelerometer (705) prevents the device from being tampered by generating and alarm message when any movement of the device is detected. A first predefined threshold is established to determine whether a measurement of the accelerometer (705) corresponds to normal operation conditions such as vibrations and movement in the room, or to a possible tampering attempt.

The thermometer (706) can generate alarm messages both when an absolute temperature range is exceeded, and when a temperature gradient exceeds some predefined values. The thermometer (706) can be implemented with any temperature sensing technology of the state of the art, as a great precision or tolerance are not required for this purposes. For example, the thermometer (706) can be a temperature sensor with a 2° C. tolerance, generating alarm messages when the measured temperature exceeds 50° C., is reduced under 0° C., or the temperature gradient exceeds a 10° C. variation within a minute. In order to reduce energy consumption, the thermometer (706) is preferably an on-chip temperature sensor.

The device comprises a battery (707) to guarantee jamming protection even if the electrical network is compromised. Furthermore, the use of a UNB network (8) with random frequency hopping in which most of the signal processing load (such as transmission frequency search and frequency compensations) occurs in the receiving base station and network nodes, greatly reduces energy consumption at the device (7), and therefore increases its autonomy and protection capabilities. Nevertheless, when the battery (707) energy level is reduced below a safety threshold and needs to be charged or replaced, an alarm message may be sent to the back-end service. Additionally or alternatively, a message notifying the user of the low battery (707) energy level can be transmitted through the user interface (704)

Figure 3:
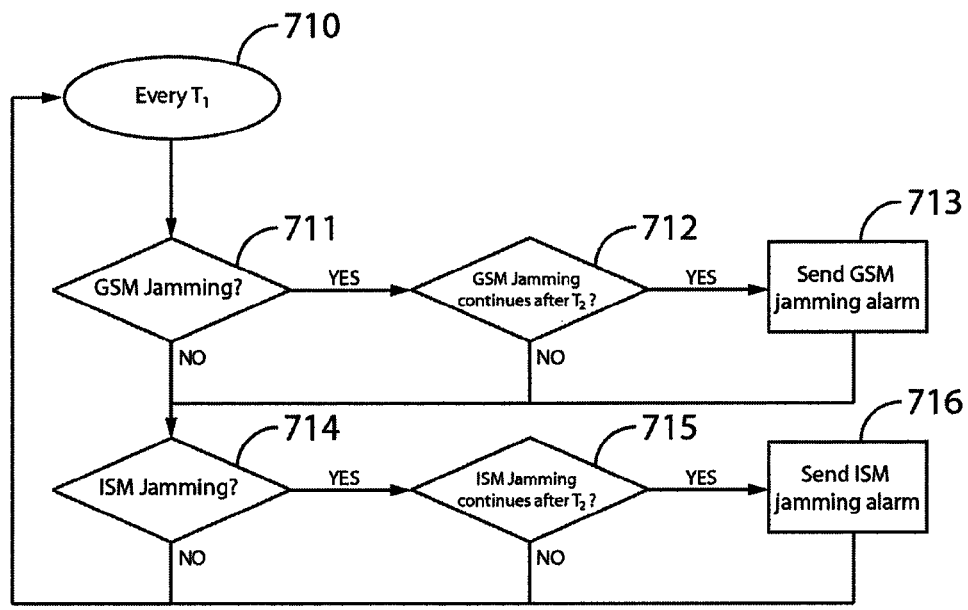
FIG. 3 depicts a simplified flowchart of a jamming detection algorithm according to a particular embodiment of the device and method of the invention.

FIG. 3 presents a particular embodiment of the decision algorithm leading to the transmission of alarm signals in the presence of jamming, implemented by the processor (703) with the data provided by the transceiver (701). The steps of the decision algorithm are periodically performed every $T_1$ (710), where $T_1$ is a configurable period with a preferred value of 20 seconds. First, the presence of jamming in the GSM network is checked (711), based on the scans performed by the transceiver (701). In order to determine if the frequency band is being jammed, the average RF power is adaptively measured. When the difference between the measured RF power at a given instant and its moving average exceeds a given threshold, the band is considered to be jammed. Notice that any alternative decision algorithm or signal processing technique may be implemented in order to determine the presence of jamming based on signal power levels in the band under analysis.

If jamming is detected, the device waits for a safety period $T_2$ before checking again (712). This prevents the system from sending alarm messages for false alarms or transitory interferences. $T_2$ is a configurable period with a preferred value of 6 seconds. If the jamming continues, an alarm indicating that the GSM network is being jammed is sent (713) to the back-end service (5). Otherwise, if no jamming is initially detected, or the jamming stops before $T_2$, no message is sent, and jamming in the ISM network is checked (714). As in the previous case, if jamming is detected, its continuity is checked again after a $T_2$ interval (715). If jamming is still present in the ISM network, the corresponding alarm message is transmitted (716).

Figure 4:
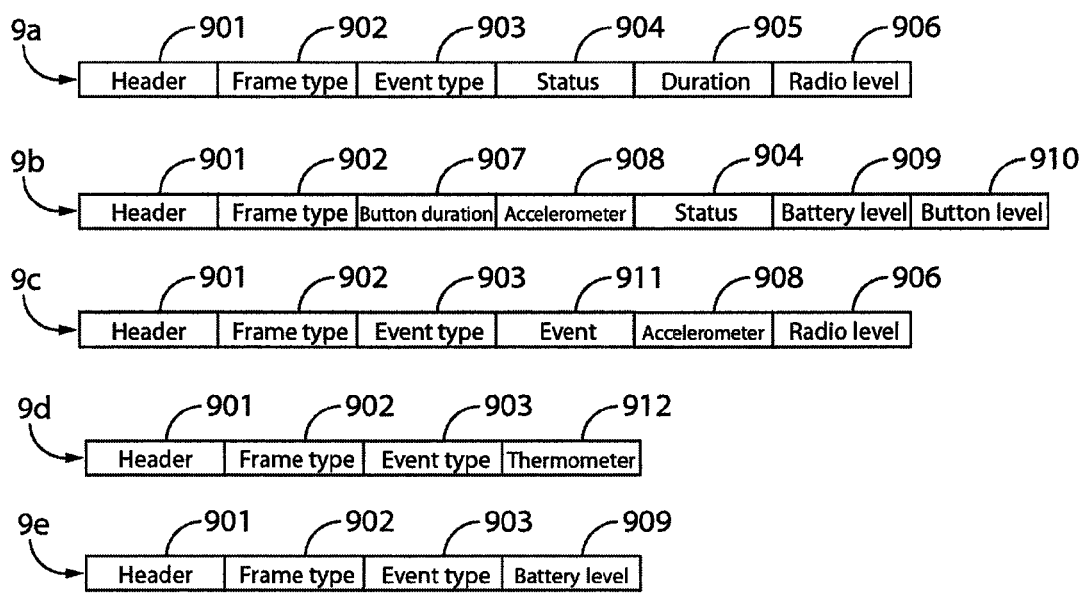
FIG. 4 illustrates a possible coding of the alarm signals sent by the jamming detection device and method according to a particular embodiment thereof.

Finally, the content of alarm messages caused by several causes are shown in FIG. 4. Note that alternative information may be coded in each message according to particular embodiments within the scope of the invention as claimed. Likewise, information coding, field length and other particulars of the communication protocol may be applied. Also note that the device (7) and the back-end service (5) may exchange any additional message beyond alarms, such as keep-alive signals, remote configuration information, statistical data transmission, etc.

In the particular embodiment shown in FIG. 4, all alarm messages comprise a header (901) and a frame type (902), regardless of the nature of the alarm. If needed, they may also comprise an event type (903) that complements the frame type (902) in order to define the purpose of the message. For example, the header may comprise an identifier corresponding to a device or to a plurality of devices in the UNB network (8), and any control information such as information regarding failed transmission attempts. The frame type (902) may identify, for example, if the transmitted message is an alarm, a booting message, a periodic keep-alive message, a debug message, a user command, a network test, or any other kind of message required by a particular embodiment of the protocol. The event type (903) field provides further details regarding the particular frame type (902), such as the nature of the alarm in alarm messages.

The fields of each alarm message depend on the particular nature of the alarm. The corresponding payload of each alarm message may be constant or vary among alarm messages depending on the particular embodiment of the protocol. For example, a jamming alarm message (9a) is sent as a result of jamming detection through frequency band scans. Its payload comprises an status field (904), that is, an identifier of the frequency band or bands (201, 401, 402) being jammed; and at least a first numerical value representing a jamming intensity (906), also named 'radio level' in the figure for conciseness. Jamming intensity (906) may be indicated separately for each analysed frequency band (201, 401, 402), and may be represented, for example, by an intensity level measured by the transceiver, or by a number or fraction of channels in which intensity levels exceed a given threshold and are considered to be rendered unfit for transmission. After the jamming is finalized and normal operation is restored, a second numerical value representing a jamming duration (905) can also be transmitted.

A user-triggered alarm message (9b) is sent as a result of the user interaction with the user interface (704), such as the user pressing a button. The message may comprise various information useful to the back-end service (5), such as the button duration (907), that is, the length of time the button has been pressed; an accelerometer measurement (908); an status field (904) similar to the jamming alarm message (9a), a battery level (909) and a button level (910) in the case of capacitive buttons.

A tamper alarm message (9c) is sent as a result of a measurement of the accelerometer (705) exceeding a threshold. It comprises said accelerometer measurement (908), and it may comprise further information such as the jamming intensity (906) and any further data describing the event detected by the accelerometer (911). Accelerometer measurement (908) is typically indicated separately for each of the three axis of the accelerometer (705).

A temperature alarm message (9d) typically comprises a thermometer measurement (912), and may comprise further information about the reason of the message in the event type (903) field, such as the alert being caused by a high temperature, a low temperature or a high temperature gradient. Likewise, a battery alarm message (9e) typically comprises a measurement of the battery level (909), and is transmitted when said battery level (909) is reduced below a safety threshold.

Note that in this text, the term "comprises" and its derivations (such as "comprising", etc.) should not be understood in an excluding sense, that is, these terms should not be interpreted as excluding the possibility that what is described and defined may include further elements, steps, etc.

In the context of the present invention, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

The invention claimed is:

1. Jamming detection device (7) comprising a transceiver (701) configured to periodically scan at least a frequency band (201) of a security system to detect jamming, if jamming is detected in the at least one frequency band (201), send an alarm signal to a back-end service (5) through a second frequency band the transceiver (701) is further configured to:
   periodically scan at least a first frequency band (201) of an Industrial Scientific and Medical radio network (2) and at least a third frequency band (401, 402) of a Global System for Mobile Communications network (4),
   if jamming is not detected in the at least one first frequency band (201) nor in the at least one third frequency band (401, 402), connect at least a peripheral (1) to a control panel (3) through the at least one first frequency band (201), being the control panel (3) connected to a back-service (7) through the at least one third frequency band (401, 402), and
   if jamming is detected in the at least one frequency band (201), or the at least one third frequency band (401, 402), send the alarm signal to a back-end service (5) through an ultra narrow band network (8) overlapped with the at least one first frequency band (201) of the Industrial Scientific and Medical radio network (2).

2. Jamming detection device (7) according to claim 1, characterized in that the at least one first frequency band (201) of the Industrial Scientific and Medical radio network (2) is centred at 868 MHz.

3. Jamming detection device (7) according to claim 1 characterized in that the transceiver (701) is configured to periodically scan a 900 MHz frequency band (401) and a 1800 MHz frequency band (402) of the Global System for Mobile Communications network (4).

4. Jamming detection device (7) according to claim 1, characterized in that the transceiver (701) comprises a local oscillator (702) configured to generate a plurality of harmonics, being at least one frequency band (201, 401, 402) scanned using a third order harmonic.

5. Jamming detection device (7) according to claim 1, characterized in that the transceiver (701) comprises modulation means configured to apply random frequency hopping to the alarm signal when accessing the Ultra Narrowband Network (8).

6. Jamming detection device (7) according to claim 1, characterized in that the transceiver (701) comprises modulation means configured to apply a binary-phase-shift-keying modulation to the alarm signal when accessing the Ultra Narrowband Network (8).

7. Jamming detection device (7) according to claim 1, characterized in that the transceiver (701) comprises modulation means configured to send the alarm signal through a channel of the Ultra Narrowband Network (8) with a bandwidth lesser or equal than 200 Hz.

8. Jamming detection device (7) according to claim 1, characterized in that the device (7) further comprises an accelerometer (705), and in that the transceiver (701) is configured to send an alarm signal to the back-end service (5) through the ultra narrow band network (8) when a measurement of the accelerometer (705) exceeds a first predefined threshold.

9. Jamming detection device (7) according to claim 1, characterized in that the device (7) further comprises a thermometer (706), and in that the transceiver (701) is configured to send an alarm signal to the back-end service (5) through the ultra narrow band network (8) when a measurement of the thermometer (706) exceeds a second predefined threshold.

10. Jamming detection device (7) according to claim 1, characterized in that the device (7) further comprises a user interface (704), and in that the transceiver (701) is configured to send an alarm signal to the back-end service (5) through the ultra narrow band network (8) when a user inputs a command through the user interface (704).

11. Jamming detection method comprising:
    periodically scanning at least a frequency band (201) of a security system to detect jamming, if jamming is detected in the at least one frequency band (201), sending an alarm signal to a back-end service (5) through a second frequency band, the method further comprising:
    periodically scanning at least a first frequency band (201) of an Industrial Scientific and Medical radio network (2) and at least a third frequency band (401, 402) of a Global System for Mobile Communications network (4),
    if jamming is not detected in the at least one first frequency band (201) nor in the at least one third frequency band (401, 402), connecting at least a peripheral (1) to a control panel (3) through the at least one first frequency band (201), being the control panel (3) connected to a back-service (7) through the at least one third frequency band (401, 402), and
    if jamming is detected in the at least one frequency band (201), or the at least one third frequency band (401, 402) sending the alarm signal to the back-end service (5) through an ultra narrow band network (8) overlapped with the at least one frequency band (201) of the Industrial Scientific and Medical radio network (2).

12. Jamming detection method of claim 11 characterized in that the step of sending the alarm signal further comprises sending an identifier (904) of the at least a frequency band (201, 401, 402) being jammed and at least a first numerical value representing a jamming intensity (906).

\* \* \* \* \*